Patented Mar. 13, 1923.

1,448,688

UNITED STATES PATENT OFFICE.

DAVID F. GOULD, OF CORNWELLS, PENNSYLVANIA, ASSIGNOR TO THE BARRETT COMPANY, A CORPORATION OF NEW JERSEY.

NAPHTHALENE CRYSTALS AND PROCESS OF MAKING THE SAME.

No Drawing.    Application filed January 26, 1922. Serial No. 532,013.

*To all whom it may concern:*

Be it known that I, DAVID F. GOULD, a citizen of the United States, residing at Cornwells, in the county of Bucks and State of Pennsylvania, have invented certain new and useful Improvements in Naphthalene Crystals and Processes of Making the Same, of which the following is a specification.

My invention relates to the manufacture of naphthalene and particularly to the production of semi-refined or refined naphthalene possessing a form and appearance different from the commonly crystallized form of naphthalene.

In my co-pending application Ser. No. 430988 filed December 15, 1920, I have described the purification of naphthalene involving the crystallization brought about by cooling a mixture of molten naphthalene and a hot aqueous liquid under agitation in such a way that the naphthalene separates into definite crystalline flakes from which adhering oil, etc., can be readily removed by centrifuging or other means. I have found that the naphthalene flakes so produced have a different form and physical appearance from the naphthalene heretofore known, or which has been obtained in other ways, such as by crystallizing from a liquid, subliming or crystallizing from the molten material alone. The crystals produced by my process have a characteristic appearance suggestive of fish scales.

As is well known, naphthalene crystallizes in the monoclinic system, the symmetry being usually monoclinic prismatic, the crystals consisting of thin leaflets parallel to the basal pinacoid. The crystals furthermore show a strong cleavage parallel to the same form.

Naphthalene in its commonest commercial form is obtained by allowing the molten material to cool and solidify without agitation and is then broken up or crushed. The crystallographic examination of naphthalene produced in this way shows it to consist of well defined individual crystals which are easily broken apart. These crystals show very little tendency to form definite crystal aggregates, and such aggregates when formed are very easily broken up. The crystals are shown to be definite, since on optical examination they extinguish as a unit between crossed Nicol prisms. Naphthalene crystallized in this way shows perfectly clear individual crystals, but, owing to the fact that there is no definite orientation, lumps of crystals are not clear but have a frosty appearance.

Naphthalene obtained by sublimation is crystallized in thin individual leaflets, the leaflets showing some tendency to grow into each other, but showing no tendency to form aggregates along the basal plane. Such crystals are perfectly clear but are usually so thin in comparison to their other dimensions that they become readily broken into irregular pieces.

Naphthalene crystallized from solvents is also obtained in the form of leaflets, the individual crystals being separate and distinct with no tendency to form aggregates. It is not commonly commercially obtained in this form.

I have found that when molten naphthalene at a temperature slightly above its melting point is agitated in a tank or other suitable container with water or aqueous salt solutions, in which it is substantially insoluble, and the whole mass slowly agitated with cooling, the solid naphthalene separates in a definite crystalline form. The following is given as illustrative of an example of carrying out the process:

A mixture of naphthalene and water may be violently agitated at a temperature of about 85° C. until an intimate mixture is obtained. The mixture may then be cooled at approximately the rate of 3 degrees per hour, while slowly agitating the same, by running in cold water or in any other convenient way until the temperature is around 65° C. This procedure has been found to produce crystalline scales of naphthalene of uniform size of the same shape and structure, consisting of several individual thin crystals of naphthalene laminated one upon the other, these scales resembling fish scales and being clear and transparent.

Instead of using water with which to mix the naphthalene, the naphthalene may be mixed with an aqueous salt solution, for example a solution of sodium chloride which is immiscible with the naphthalene.

I have found that naphthalene produced by my process, whether crude, semi-refined, or completely refined, exhibits the same general physical characteristics described above as resembling fish scales. The scales are of considerable thickness in comparison with their other dimensions as contrasted with the form of crystal obtained from other processes. A crystallographic examination of this naphthalene reveals the fact that the scales, while perfectly clear and apparently definite crystals, are actually aggregates of a great number of individual leaflets not definitely oriented but firmly adhering to each other along the plane of the basal pinacoid. The fact that this is the case is brought out very clearly on an optical examination of such an aggregate under crossed Nicol prisms, the individual crystals extinguishing independently when viewed in this way. The aggregates are, however, so firmly bound together that it is as difficult to break up the aggregate by shearing force as it is to cleave an individual crystal.

It will readily be seen from the above description that the crystals of naphthalene produced by my process have advantages superior to the common crushed form of naphthalene, in that they give a better appearance due to the individual scales being clear, transparent and of uniform shape and size, and furthermore that they posses advantages over the sublimed form of naphthalene in that on account of their greater thickness they do not necessitate so bulky a package, while they at the same time present a distinctive appearance not found in any other commercial form of naphthalene. A distinct and important advantage of these crystals over other forms of naphthalene is the fact that they do not tend to adhere to one another when stored in bulk, as do other commercial forms of naphthalene.

Having thus described my invention, I claim:

1. Naphthalene in the form of crystal aggregates of individual crystals, said crystals being firmly bound together along their basal planes.

2. A plurality of naphthalene crystals superposed and firmly bound together along their basal planes to form a crystalline aggregate.

3. Aggregates of naphthalene crystals oriented irregularly but in a single plane and presenting the superficial appearance of single, clear and homogeneous crystals.

4. Naphthalene crystal aggregates free from the tendency to adhere to each other.

5. Naphthalene scales having a thickness, compared with their other dimensions, greater than a single crystal.

6. Naphthalene scales made up of individual crystals, said scales being substantially as difficult to separate as it is to cleave an individual crystal along its basal plane.

7. As a new product, naphthalene consisting of crystal aggregates of individual crystals firmly bound together along the basal plane, but not otherwise oriented, and having the superficial appearance of a single clear and transparent homogeneous crystal.

8. In the process of producing crystal aggregates, the steps which comprise agitating a molten mass of naphthalene with an aqueous salt solution that is immiscible therewith, and gradually cooling the mass while agitating the same to effect relatively slow crystallization of the naphthalene.

9. In the process of producing crystal aggregates, the step which consists in agitating molten naphthalene and an aqueous sodium chloride solution, and slowly cooling the mixture below the melting point of naphthalene.

In testimony whereof I affix my signature.

DAVID F. GOULD.